Figure 1:
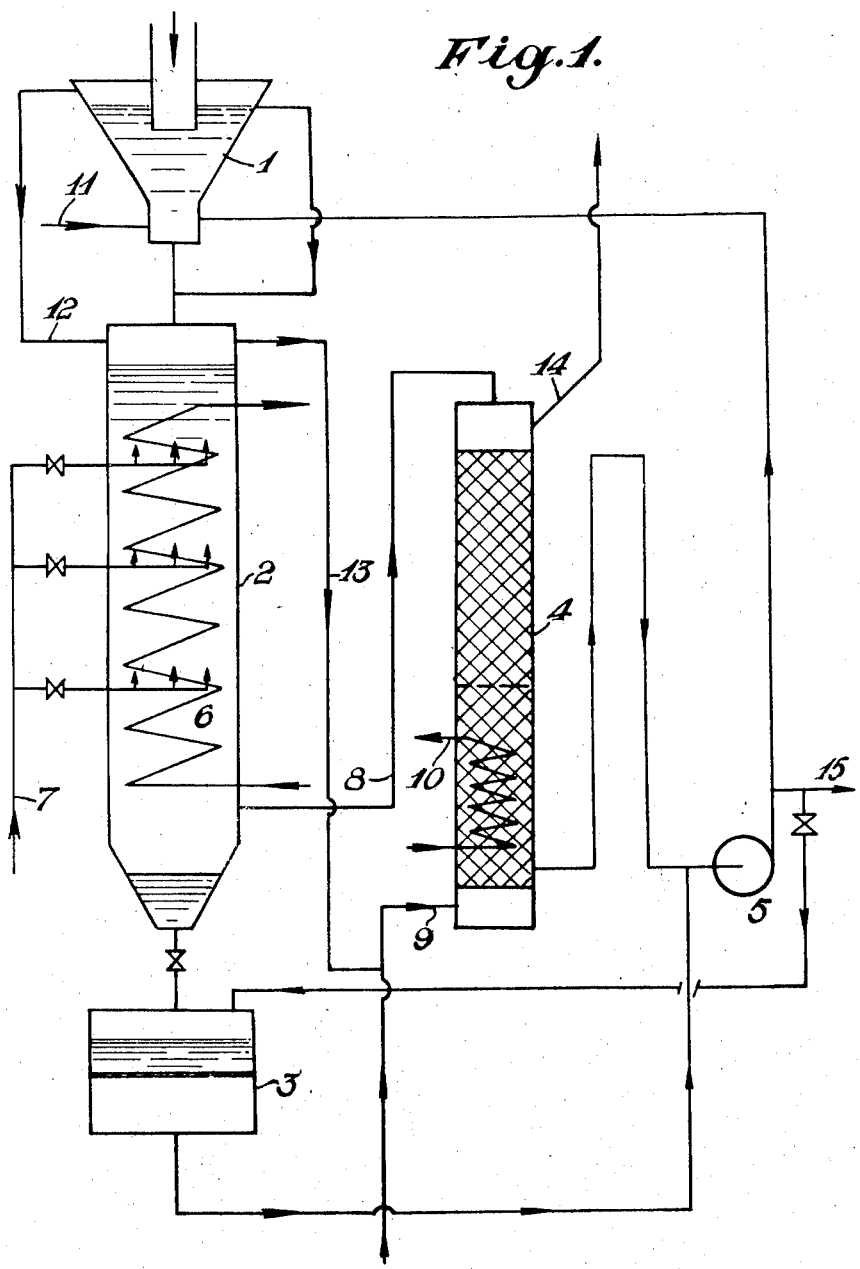

United States Patent Office 2,861,871
Patented Nov. 25, 1958

2,861,871

PROCESS FOR THE MANUFACTURE OF CHLORINE DIOXIDE

Angelo Germano, Lausanne, Switzerland, assignor to Solvay & Cie, Brussels, Belgium, a Belgian company Application October 8, 1956, Serial No. 614,400

Claims priority, application Belgium October 8, 1955

7 Claims. (Cl. 23—152)

The invention relates to the manufacture of chlorine dioxide by reaction of hydrochloric acid with sodium chlorate according to the reaction:

$$2NaClO_3 + 4HCl \rightarrow 2ClO_2 + Cl_2 + 2NaCl + 2H_2O \quad (1)$$

According to this reaction the molecular ratio of $$\frac{Cl_2}{ClO_2}$$

in the gaseous mixture produced should equal 0.5. The ratio is actually higher because of the additional liberation of chlorine produced by the side reaction $$NaClO_3 + 6HCl \rightarrow 3Cl_2 + NaCl + 3H_2O \quad (2)$$

It is known that, on the one hand, in the carrying out of Reaction 1 the molecular ratio $$\frac{HCl}{NaClO_3}$$

of the reagents employed and the temperature of the reaction medium have a direct effect on the decomposition speed of the chlorate, but, on the other hand, by reason of Reaction 2 it is advantageous to keep this ratio below 2.

It has been proposed to reconcile these contradictory conditions by reacting the chlorate with a quantity of acid which is less than that stoichiometrically required, and by slowly raising the temperature of the reaction medium as and when the acid concentration of the solution decreases. To the residual solution containing unreacted chlorate new quantities of fresh chlorate are added in order to produce subsequently chlorine dioxide. This re-cycling can however only take place after the by-products of the reaction, i. e. water and sodium chloride, have been removed. This operation is difficult to carry out since during the evaporation of water, the chlorate precipitates together with the sodium chloride.

The object of the invention is to provide a process which enables the decomposition of sodium chlorate by hydrochloric acid to be carried out under conditions which appreciably impair the side reaction 2 producing mainly chlorine.

Another object of the invention is to provide a process for the manufacture of chlorine dioxide which enables the sodium chloride obtained as by-product to be easily separated in a technically pure state.

Finally it is an object of the invention to provide a process which enables the production of chlorine dioxide to be carried out in a continuous manner.

The invention is based on the surprising fact that by operating at a low temperature it is even possible in the presence of an excess of hydrochloric acid with respect to the stoichiometric quantity to decompose comparatively appreciable quantities of sodium chlorate per unit of reactor volume and to obtain at the same time a gaseous mixture rich in $ClO_2$ by subsequent desorption of the solution thus obtained.

According to the invention, the process of preparing chlorine dioxide from sodium chlorate and hydrochloric acid consists in reacting more than two molar proportions of hydrochloric acid per molar proportion of sodium chlorate, at a temperature sufficiently low, preferably below $+10°$ C., in such a manner as to precipitate the sodium chloride which is separated, to desorb the chlorine dioxide and the chlorine from the solution thus obtained by the action of an inert gas and/or heat, and to re-use the residual solution for preparing a new solution of sodium chlorate with a view to the subsequent manufacture of chlorine dioxide.

At the envisaged temperatures and in the absence of an inert gas, the chlorine dioxide produced by the reaction remains in the dissolved state. Chlorine is however partially liberated and for this reason a small proportion of chlorine dioxide is carried off. The gases collected in the gas chamber located above the reactor have a molecular ratio of $Cl_2/ClO_2$ of distinctly more than 0.5. On the other hand by desorption of the gases in the solution, a mixture is obtained which shows a very favourable $Cl_2/ClO_2$ ratio which may be even less than the theoretical ratio of 0.5. The process thus already enables a partial separation of chlorine from chlorine dioxide.

The gases successively produced may however be mixed and the mixture thus obtained has a ratio $Cl_2/ClO_2$ of about 0.6.

The applicant has also observed the surprising fact that by operating at a low temperature under the above specified conditions, the quantity of chlorate contained in the sodium chloride which precipitates in the course of the reaction sharply decreases to zero if the reagents are used in a molecular ratio of $HCl/NaClO_3$ of more than 2.8. It is however advantageous to limit this ratio and not to exceed 3.2.

Since a conversion rate of from 75 to 90 percent can easily be obtained at low temperatures after a reaction of about 4 hours, a molecular ratio of $HCl/NaClO_3$ used comprised between 2.8 and 3.2 will involve a molecular ratio comprised between 5 and 20 in the residual solution. It can be assumed that the precipitation of the pure NaCl free from chlorate is due to the combined action of the temperature and the higher HCl concentration of the mother liquor.

When working at atmospheric pressure, the reaction medium is maintained below $+10°$ C. so as to avoid the evolution of the $ClO_2$ produced in the course of the reaction. It is also possible to work at slightly more elevated temperatures under higher pressures but at normal pressure it is more advantageous to work at greatly reduced temperatures, reaching $-25°$ C.

The discontinuous process may be carried out as follows:

A solution of sodium chlorate, preferably saturated in chlorate, and obtained by the addition of chlorate to a residual solution coming from a previous manufacture, is introduced into a reactor.

This solution is maintained at a low temperature, for example between $-5$ and $-15°$ C., whilst an aqueous solution of hydrochloric acid or anhydrous hydrogen chloride is injected at a ratio of more than 2 molecules of HCl per molecule of chlorate used. The reaction proceeds for about 4 hours until 75–90 percent of the chlorate has reacted. The precipitate formed is filtered, whereupon an inert gas is injected into the solution in such a manner that the chlorine dioxide and the dissolved chlorine are desorbed. The desorption is made more effective by slightly heating the solution. The molecular ratio of $Cl_2/ClO_2$ in the gases carried off is about 0.6. The residual solution can be used for the preparation of a fresh sodium chlorate solution.

If the molecular ratio of HCl/NaClO$_3$ of the reagents used is more than 2.8, the separated precipitate consists of NaCl. In the other case the precipitate also contains sodium chlorate. If so desired, hydrochloric acid can be added at the end of the reaction in order to facilitate the precipitation of NaCl.

The process can be carried in a continuous way by effecting the decomposition of the chlorate and the desorption of the resulting solution in separate apparatus.

Several alternatives of the manufacturing cycle may be employed. In the following, there will be described the two principal alternatives comprising either a supply of gaseous HCl direct to the reactor or a supply of an aqueous solution of HCl prepared by the dissolution of hydrogen chloride in a re-cycling residual liquor.

The first alternative which is the most simple method has however the disadvantage of necessitating high refrigeration of the reactor in order to compensate for the heat of solution of HCl. The second method must comprise heating a portion of the re-cycling solution before introduction of the gaseous HCl. The second alternative thus leads to a molecular ratio of Cl$_2$/ClO$_2$ in the gases produced which is slightly higher than that of the first method. A third alternative would be in avoiding this saturation with gaseous HCl, and discharging a portion of the re-cycle after exhaustion of the chlorate, the supply to the reactor being then effected by a fresh solution of acid.

The scheme shown in Figure 1 relates to a continuous process which makes use of gaseous hydrogen chloride for acidifying the solution.

Sodium chlorate is introduced in a solid state into a dissolver 1 and dissolved in the residual liquor of a previous manufacture delivered by the pump 5. The solution thus obtained is introduced into the reactor 2 which is formed by a column provided with a cooling-coil 6. Hydrogen chloride is introduced by the pipe system 7 at several points disposed along the descending passage of the solution in the column 2. The solution thus meets fresh quantities of acid as and when the reaction progresses. The temperature of the reaction mixture is maintained at the desired value by circulating a cold brine in the cooling-coil 6.

Sodium chloride which precipitates is decanted to the bottom of the column and received on the filter 3, and washed by a re-cycling residual liquor by means of the pump 5. The clear liquor flows out from the column and is led to the top of the desorption apparatus 4 by the pipe system 8. The desorption is effected by the injection of inert gas at 9 and by heating the liquid with the aid of the coil 10 through which water circulates at ambient temperature.

The inert gas introduced at 9 is mixed first with the sweeping gases introduced at 11 and coming from the conduits 12 and 13. The gaseous mixture led to the top of the desorber 4 through the pipe 14 forms the final product. It is a mixture of chlorine dioxide, chlorine and of the inert gas having a molecular ratio of Cl$_2$/ClO$_2$ of about 0.6.

The desorbed liquor is taken up by the pump 5 and re-used for a new manufacturing cycle. At 15 a sufficient purge of this liquid cycle is carried out in order to remove in a continuous way the water produced by the reaction and also certain contaminations of the sodium chlorate which might concentrate in the re-cycling solution.

Figure 2:
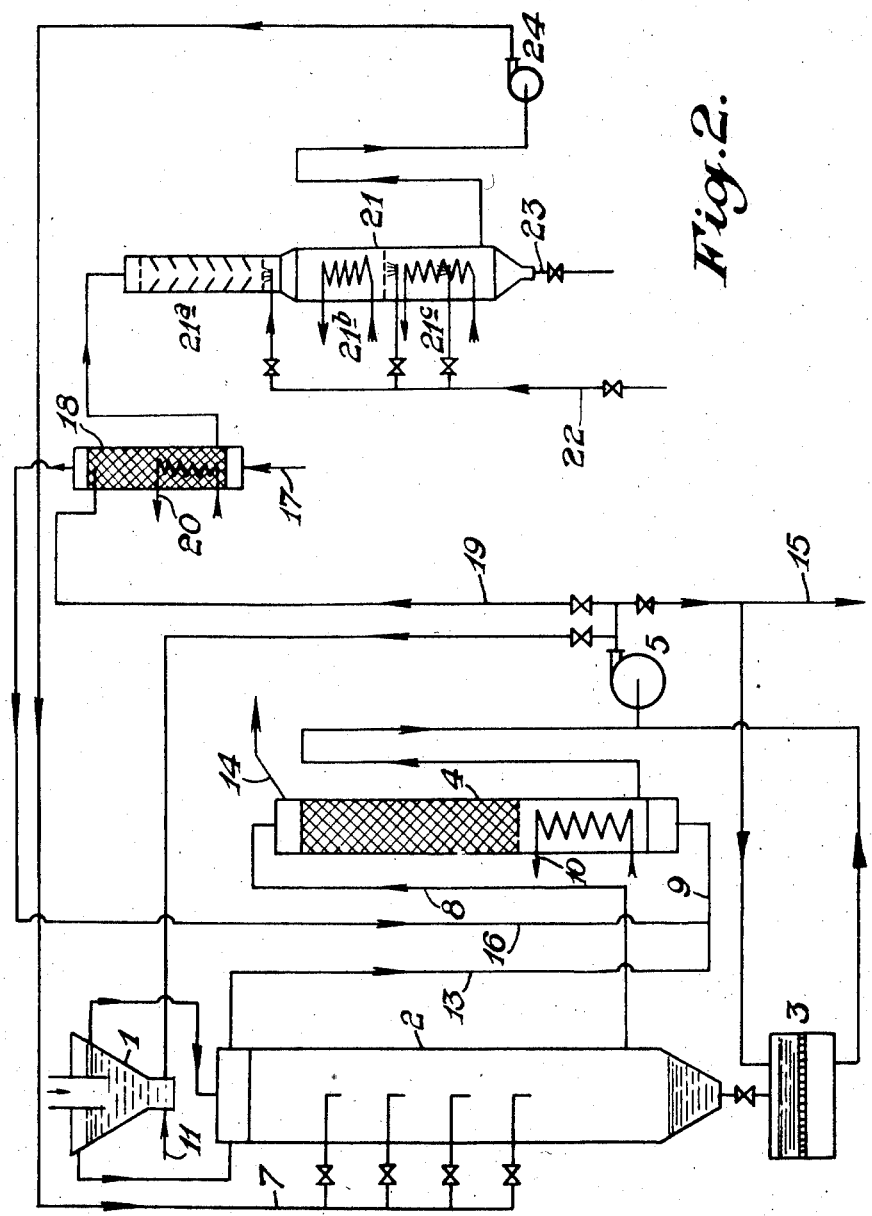

The scheme of Figure 2 shows an alternative of the continuous process according to which a fraction of the residual liquor is used for the dissolution of gaseous HCl.

The starting solution is prepared in the dissolver 1 by the addition of solid chlorate to a portion of the residual liquor delivered by the pump 5. The aqueous solution of hydrochloric acid prepared, as indicated below, is introduced into the reactor 2 by the conduit 7 at different heights in the descending passage of the solution. Crystalline sodium chloride is decanted to the bottom of the reactor and collected on the filter 3 where it is washed, as in the previous case, by a fraction of the residual liquor removed from the cycle after the pump 5. The clear liquor of the column 2 is led through the conduit 8 to the top of the desorption apparatus 4 fed with inert gas at 9, a portion of this gas being introduced into the dissolver 1 at 11 and withdrawn through the conduit 13 after sweeping the upper chamber of the reactor 2, the other portion being introduced at 17 in order to recover the gases produced in the apparatus 18 and withdrawn by the conduit 16.

The gases desorbed at 4 are withdrawn by the conduit 14. They form the final product. The residual liquor is taken up by the pump 5. Two fractions are used for the preparation of the chlorate solution and the washing of NaCl, the remaining fraction is used for the preparation of the aqueous HCl solution. This fraction is led to the top of the auxiliary desorption reactor 18 heated by hot water circulating through the exchanger 20 and supplied with inert gas at 17. The gaseous mixture produced is returned to the main desorption apparatus 4 through the conduit 16. The heater liquor is introduced at the top of the HCl dissolver 21 which comprises three sections: an upper section 21a, fitted with drip plates, a middle section 21b cooled by water and a lower section 21 fitted with a cooling-coil supplied with cold brine. Each of these sections is fed with gaseous hydrogen chloride by the conduit 22. Sodium chloride precipitated in the dissolver is removed at 23 whilst the acid solution is introduced into the reactor 2 by the conduit 7 by means of the acid pump 24.

Whatever the manufacturing cycle may be the temperature in the reactor 2 is maintained at below +10° C., preferably comprised between 0 and —25° C.

The time which the reagents remain in the reaction column is dependent on the temperature so that the conversion rate of the chlorate is as high as possible. When working according to the second alternative care must be taken that the conversion rate is 85–90 percent since a fraction of residual liquor will be freed from chlorate when hot, and operation involving an unsatisfactory yield of chlorine dioxide. When working according to the first alternative, a lower conversion rate may satisfy, for example 70 percent, since no substantial loss in the yield of ClO$_2$ takes place.

By way of example which is however not limitative, the manufacture of 1000 kilograms of ClO$_2$ per unit of time is described below according to the aforesaid two main alternatives.

*Example 1 (Figure 1)*

1638.5 kilograms of solid chlorate are introduced per time unit into the dissolver 1 and by means of the pump 5, 7490 kilograms of residual solution at about +10° C. containing:

| | Kg. |
|---|---|
| H$_2$O | 6340 |
| NaClO$_3$ | 181 |
| HCl | 679.5 |
| NaCl | 289.5 |

The solution of chlorate resulting therefrom reaches a temperature comprised between 0 and +5° C. because of the negative heat of solution of the chlorate. The solution is led to the top of the column 2 where it is reacted with 1220.6 kilograms of hydrogen chloride introduced into the reactor at 20° C. by conduit 7 at three different heights (molecular ratio of HCl/NaClO$_3$=3). The temperature at the base of the column 2 is kept at —15° C. by the circulation of brine entering the cooling-coil 6 at —25° C.; 862 kilograms of sodium chloride are collected on the filter 3 per unit of time. The cold solution is introduced at the top of the desorption apparatus 4, heated at the bottom by a coil through which circulates water at ambient temperature. It meets an ascending stream of 3520 kilograms of air at 20° C., 570 kilograms of which were introduced at 11 for sweeping out the dissolver 1 and of the gas chamber of the column 2. At 14, there are collected 5152 kilograms of a gaseous mixture per unit of time containing

| | Kg. |
|---|---|
| Air | 3520 |
| $ClO_2$ | 1000 |
| $Cl_2$ | 632 | and corresponding to a molecular ratio of $Cl_2/ClO_2$ of 0.6.

The residual solution is re-used for the preparation of the chlorate solution after a purge carried out at 15 containing

| | Kg. |
|---|---|
| $H_2O$ | 293 |
| $NaClO_3$ | 8 |
| HCl | 31 |
| NaCl | 13.5 |

*Example 2 (Figure 2)*

Into the reaction column 2 there are introduced in a continuous manner:

At the top a solution of chlorate at 5° C. obtained by dissolving 1677 kilograms of $NaClO_3$ in 2477 kilograms of residual solution supplied by the pump 5 and containing

| | Kg. |
|---|---|
| $H_2O$ | 2000 |
| $NaClO_3$ | 81 |
| HCl | 304 |
| NaCl | 92 | and at three different heights of the column, 3509 kilograms of an aqueous solution of HCl at a temperature of about −10° C. obtained as indicated below.

The temperature at the outlet of the column 2 remains at about −15° C.

774 kilograms of sodium chloride are separated out on the filter 3 and washed with residual liquor by means of the pump 5. The solution leaving at the bottom of the column 2 is introduced at the top of the desorption apparatus 4 provided with inert materials in the upper part and cooled in the lower part by circulating water at ambient temperature. The solution meets there a stream of 3520 kilograms of air of which 570 kilograms are introduced into the dissolver at 11 and 2950 kilograms into the auxiliary apparatus 18 at 17. The gas produced and containing 1000 kilograms of $ClO_2$ and 688 kilograms of chlorine corresponding to a molecular ratio of $Cl_2/ClO_2$ of 0.65 is separated out at 14.

2477 kilograms of the residual solution are used for the dissolution of $NaClO_3$ as indicated above, and the same quantity for the dissolution of HCl which is treated as follows: it is led by the conduit 9 to the top of the auxiliary apparatus 18, heated at the bottom by the exchanger 20 through which circulates water at 50–60° C. There, the completion of the reaction of HCl with the chlorate takes place and a simultaneous liberation under the carrying off action of 2950 kilograms of air introduced at 17. The gases carried over contain 30.5 kilograms of $ClO_2$ and 79 kilograms of chlorine (molecular ratio of $Cl_2/ClO_2$=about 2.5).

The solution leaving at 40–50° C. still contains 204 kilograms of HCl and 135 kilograms of NaCl per 2000 kilograms of water. 1300 kilograms of HCl are dissolved in the apparatus 21 with sufficient cooling in order to discharge a solution at −10° C. containing

| | Kgs. |
|---|---|
| $H_2O$ | 2000 |
| HCl | 1499 |
| NaCl | 10 |

125 kilograms of NaCl were precipitated in the dissolver 21 and separated out at the bottom.

I claim:

1. A process for the preparation of chlorine dioxide from sodium chlorate and hydrochloric acid which comprises the steps of introducing hydrochloric acid into a solution of sodium chlorate in an amount which is greater than the stoichiometric quantity corresponding to the chlorate to produce a mixture of chlorine dioxide and chlorine, the temperature being maintained at a value sufficiently below 10° C. that the chlorine dioxide which is formed remains substantially completely in solution, and continuing the reaction until at least some of the sodium chloride formed in the course of the reaction precipitates, separating the sodium chloride from the solution, desorbing the solution to separate the chlorine dioxide and any chlorine contained therein.

2. A process for the preparation of chlorine dioxide from sodium chlorate and hydrochloric acid which comprises the steps of introducing hydrogen chloride into a solution of sodium chlorate in the amount of 2.8 to 3.2 moles per mole of the chlorate to produce a mixture of chlorine dioxide and chlorine, the temperature being maintained at a value sufficiently below 10° C. that the chlorine dioxide which is formed remains substantially completely in solution, and continuing the reaction until at least some of the sodium chloride formed in the course of the reaction precipitates, separating the sodium chloride from the solution, desorbing the solution to separate the chlorine dioxide and any chlorine contained therein.

3. A process for the preparation of chlorine dioxide from sodium chlorate and hydrochloric acid which comprises the steps of introducing hydrochloric acid into a solution of sodium chlorate in an amount which is greater than the stoichiometric quantity corresponding to the chlorate to produce a mixture of chlorine dioxide and chlorine, the temperature being maintained at a value sufficiently below 10° C. that the chlorine dioxide which is formed remains substantially completely in solution, and continuing the reaction until at least some of the sodium chloride formed in the course of the reaction precipitates, separating the sodium chloride from the solution, desorbing the solution to separate the chlorine dioxide and any chlorine contained therein to leave a residual solution, and employing at least a portion of the residual solution to dissolve an additional quantity of sodium chlorate for use in the preparation of a further quantity of chlorine dioxide.

4. A process for the preparation of chlorine dioxide from sodium chlorate and HCl which comprises the steps of introducing gaseous hydrogen chloride into a solution of sodium chlorate in an amount which is greater than the stoichiometric quantity corresponding to the chlorate to produce a mixture of chlorine dioxide and chlorine, the temperature being maintained at a value sufficiently below 10° C. that the chlorine dioxide which is formed remains substantially completely in solution, and continuing the reaction until at least some of the sodium chloride formed in the course of the reaction precipitates, separating the sodium chloride from the solution, desorbing the solution to separate the chlorine dioxide and any chlorine contained therein to leave a residual solution, and employing at least a portion of the residual solution to dissolve an additional quantity of sodium chlorate for use in the preparation of a further quantity of chlorine dioxide.

5. A process for the preparation of chlorine dioxide from sodium chlorate and hydrochloric acid which comprises the steps of introducing hydrochloric acid into a solution of sodium chlorate in an amount which is greater than the stoichiometric quantity corresponding to the chlorate to produce a mixture of chlorine dioxide and chlorine, the temperature being maintained at a value sufficiently below 10° C. that the chlorine dioxide which is formed remains substantially completely in solution, and continuing the reaction until at least some of the sodium chloride formed in the course of the reaction precipitates, separating the sodium chloride from the solution, desorbing the solution to separate the chlorine dioxide and any chlorine contained therein to leave a residual solution, and employing at least a portion of the residual solution to dissolve an additional quantity of sodium chlorate for use in the preparation of a further quantity of chlorine dioxide, said hydrochloric acid being dissolved in the residual solution thus obtained from the previous employment of said process.

6. A continuous process for producing chlorine dioxide which comprises the steps of dissolving sodium chlorate in an aqueous medium, introducing this solution continuously into a reaction zone while simultaneously introducing into said zone hydrochloric acid in an amount which is in excess of the stoichiometric quantity corresponding to the sodium chlorate, the temperature in said zone being maintained at a value sufficiently below 10° C. that the chlorine dioxide which is formed remains substantially completely in solution, and maintaining a time of contact between the reactants to precipitate substantially all of the sodium chloride formed in the course of the reaction, separating the sodium chloride from the solution, desorbing the solution to separate chlorine dioxide and chlorine to leave a residual solution, and recycling the residual solution to the process to dissolve an additional quantity of sodium chlorate for use for the preparation of a further quantity of chlorine dioxide, said aqueous medium being at least a portion of the residual solution thus produced in a preceding cycle of said continuous process.

7. A continuous process for producing chlorine dioxide which comprises the steps of dissolving sodium chlorate in a first aqueous medium, introducing the sodium chlorate solution and a solution of hydrogen chloride in a second aqueous medium continuously into a reaction zone, the amount of hydrogen chloride being in excess of the stoichiometric quantity corresponding to said sodium chlorate, the temperature in said zone being maintained at a value sufficiently below 10° C. that the chlorine dioxide which is formed remains substantially completely in solution, and maintaining a time of contact between the reactants to precipitate at least a portion of the sodium chloride formed in the course of the reaction, separating the sodium chloride from the solution, desorbing the solution to separate chlorine dioxide and chlorine to leave a first residual solution, recycling a portion of the residual solution to the process to dissolve an additional quantity of sodium chlorate for use in the preparation of a further quantity of chlorine dioxide, and heating the remainder of said residual solution to a temperature of at most 60° C. to complete the reaction and to produce a further quantity of chlorine dioxide and chlorine, separating said chlorine dioxide and said chlorine from said heated solution to produce a second residual solution, adding hydrochloric acid to said last-named solution, separating the sodium chloride precipitated upon dissolution of said hydrochloric acid, and recycling the resulting mother liquor to said reaction zone, said first aqueous medium and said second aqueous medium being the first residual solution and the second residual solution, respectively, thus produced in a preceding cycle of said continuous process.

References Cited in the file of this patent

UNITED STATES PATENTS 2,317,443   Cunningham _____ Apr. 27, 1943

FOREIGN PATENTS 465,168   Canada _____ May 16, 1950